United States Patent
Paton et al.

(10) Patent No.: US 10,424,009 B1
(45) Date of Patent: Sep. 24, 2019

(54) SHOPPING EXPERIENCE USING MULTIPLE COMPUTING DEVICES

(71) Applicant: Amazon Technologies, Inc., Reno, NV (US)

(72) Inventors: Christopher Henry Paton, Edinburgh (GB); Harry James Lewis Eakins, Lancashire (GB); Simon Lloyd Spencer, Edinburgh (GB); Geoffrey Benjamin Thubron, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 1134 days.

(21) Appl. No.: 13/778,846

(22) Filed: Feb. 27, 2013

(51) Int. Cl.
*G06Q 30/06* (2012.01)

(52) U.S. Cl.
CPC .............................. *G06Q 30/0643* (2013.01)

(58) Field of Classification Search
USPC ........................................................ 705/27.2
See application file for complete search history.

(56) References Cited

U.S. PATENT DOCUMENTS

| | | | |
|---|---|---|---|
| 5,260,556 A | 11/1993 | Lake et al. | |
| 5,596,705 A | 1/1997 | Reimer et al. | |
| 5,691,527 A | 11/1997 | Hara et al. | |
| 5,692,212 A | 11/1997 | Roach | |
| 5,781,730 A | 7/1998 | Reimer et al. | |
| 6,065,042 A | 5/2000 | Reimer et al. | |
| 6,556,722 B1 | 4/2003 | Russell et al. | |
| 7,103,541 B2 | 9/2006 | Attias et al. | |
| 7,293,275 B1 | 11/2007 | Krieger et al. | |
| 7,444,593 B1 | 10/2008 | Reid | |
| 7,558,865 B2 | 7/2009 | Lin et al. | |
| 7,774,075 B2 | 8/2010 | Lin | |
| 7,814,521 B2 | 10/2010 | Ou et al. | |
| 8,161,082 B2 | 4/2012 | Israel et al. | |
| 8,209,396 B1 | 6/2012 | Raman et al. | |
| 8,250,605 B2 | 8/2012 | Opaluch | |
| 8,365,235 B2 | 1/2013 | Hunt et al. | |

(Continued)

FOREIGN PATENT DOCUMENTS

| | | |
|---|---|---|
| EP | 1993282 | 11/2008 |
| EP | 2071578 | 6/2009 |

(Continued)

OTHER PUBLICATIONS

Anonymous, Swivel by FaceCake, the World's First 3D Virtual Dressing Room Showcased at Computex Taipei 2012, Jul. 12, 2012, Business Wire, 0EIN, p. 1. (Year: 2012).*

(Continued)

*Primary Examiner* — Jason B Dunham
*Assistant Examiner* — Brittany E Bargeon
(74) *Attorney, Agent, or Firm* — Thomas|Horstemeyer, LLP

(57) ABSTRACT

Disclosed are various embodiments for facilitating a shopping experience that spans multiple display devices of multiple computing devices. Image data for a selected item is obtained from an item catalog. The selected item corresponds to a user selection made via a first computing device. An image of the user is obtained. An image of the selected item is rendered relative to the image of the user on a display of a second computing device. The image of the selected item is generated from the image data.

25 Claims, 9 Drawing Sheets

(56) References Cited

U.S. PATENT DOCUMENTS

| | | | |
|---|---|---|---|
| 8,510,775 B2 | 8/2013 | Lafreniere et al. | |
| 8,510,779 B2 | 8/2013 | Slothouber et al. | |
| 8,552,983 B2 | 10/2013 | Chiu | |
| 8,644,702 B1 | 2/2014 | Kalajan | |
| 8,689,255 B1* | 4/2014 | Gregov | H04N 21/4722 725/14 |
| 8,763,041 B2 | 6/2014 | Timmermann et al. | |
| 8,849,943 B2 | 9/2014 | Huang et al. | |
| 8,955,021 B1 | 2/2015 | Treder et al. | |
| 9,078,030 B2 | 7/2015 | Kuo | |
| 9,113,128 B1 | 8/2015 | Aliverti et al. | |
| 9,241,187 B2 | 1/2016 | Ricci | |
| 2002/0042920 A1 | 4/2002 | Thomas et al. | |
| 2002/0059610 A1 | 5/2002 | Ellis | |
| 2003/0050863 A1 | 3/2003 | Radwin | |
| 2004/0028258 A1 | 2/2004 | Naimark et al. | |
| 2004/0056097 A1 | 3/2004 | Walmsley et al. | |
| 2004/0133919 A1 | 7/2004 | Incentis | |
| 2004/0197088 A1 | 10/2004 | Ferman et al. | |
| 2005/0160465 A1 | 7/2005 | Walker | |
| 2005/0177538 A1 | 8/2005 | Shimizu et al. | |
| 2005/0264527 A1 | 12/2005 | Lin | |
| 2006/0007452 A1 | 1/2006 | Gaspard et al. | |
| 2006/0184538 A1 | 8/2006 | Randall et al. | |
| 2006/0271836 A1 | 11/2006 | Morford et al. | |
| 2006/0278722 A1 | 12/2006 | Tominaga | |
| 2007/0061724 A1 | 3/2007 | Slothouber et al. | |
| 2007/0143737 A1 | 6/2007 | Huang et al. | |
| 2008/0002021 A1 | 1/2008 | Guo et al. | |
| 2008/0005222 A1 | 1/2008 | Lambert et al. | |
| 2008/0066135 A1 | 3/2008 | Brodersen et al. | |
| 2008/0148317 A1 | 6/2008 | Opaluch | |
| 2008/0172293 A1 | 7/2008 | Raskin et al. | |
| 2008/0196072 A1* | 8/2008 | Chun | H04H 60/80 725/105 |
| 2008/0209465 A1 | 8/2008 | Thomas et al. | |
| 2008/0235749 A1* | 9/2008 | Jain | H04N 7/17318 725/114 |
| 2008/0271068 A1 | 10/2008 | Ou et al. | |
| 2009/0018898 A1 | 1/2009 | Genen | |
| 2009/0019009 A1 | 1/2009 | Byers | |
| 2009/0081950 A1* | 3/2009 | Matsubara | H04H 60/80 455/3.06 |
| 2009/0089186 A1* | 4/2009 | Paolini | G06Q 10/0637 705/26.1 |
| 2009/0090786 A1 | 4/2009 | Hovis | |
| 2009/0094113 A1 | 4/2009 | Berry et al. | |
| 2009/0138906 A1 | 5/2009 | Eide et al. | |
| 2009/0199098 A1 | 8/2009 | Kweon et al. | |
| 2009/0228919 A1 | 9/2009 | Zott et al. | |
| 2010/0057782 A1 | 3/2010 | McGowan et al. | |
| 2010/0092079 A1 | 4/2010 | Aller | |
| 2010/0103106 A1 | 4/2010 | Chui | |
| 2010/0153831 A1 | 6/2010 | Beaton | |
| 2010/0154007 A1 | 6/2010 | Touboul et al. | |
| 2010/0199219 A1 | 8/2010 | Poniatowski et al. | |
| 2010/0222102 A1* | 9/2010 | Rodriguez | G06Q 30/02 455/557 |
| 2010/0251292 A1* | 9/2010 | Srinivasan | H04H 20/57 725/37 |
| 2010/0287592 A1 | 11/2010 | Patten et al. | |
| 2010/0312596 A1* | 12/2010 | Saffari | G06F 3/0481 705/7.32 |
| 2011/0023073 A1 | 1/2011 | McCarthy et al. | |
| 2011/0047299 A1* | 2/2011 | Yu | H04L 67/16 710/11 |
| 2011/0049250 A1 | 3/2011 | Hovis et al. | |
| 2011/0067061 A1 | 3/2011 | Karaoguz et al. | |
| 2011/0131520 A1 | 6/2011 | Al-Shaykh et al. | |
| 2011/0154405 A1 | 6/2011 | Isaias | |
| 2011/0162007 A1 | 6/2011 | Karaoguz et al. | |
| 2011/0167456 A1* | 7/2011 | Kokenos | G06Q 30/02 725/60 |
| 2011/0173659 A1 | 7/2011 | Lafreniere et al. | |
| 2011/0181780 A1 | 7/2011 | Barton | |
| 2011/0246495 A1 | 10/2011 | Mallinson | |
| 2011/0282906 A1 | 11/2011 | Wong | |
| 2011/0289534 A1 | 11/2011 | Jordan et al. | |
| 2011/0296465 A1 | 12/2011 | Krishnan et al. | |
| 2012/0014663 A1* | 1/2012 | Knight | G11B 27/034 386/240 |
| 2012/0033140 A1 | 2/2012 | Xu | |
| 2012/0072953 A1 | 3/2012 | James et al. | |
| 2012/0096499 A1 | 4/2012 | Dasher et al. | |
| 2012/0151530 A1 | 6/2012 | Krieger et al. | |
| 2012/0210205 A1 | 8/2012 | Sherwood et al. | |
| 2012/0220223 A1 | 8/2012 | Rose et al. | |
| 2012/0238363 A1* | 9/2012 | Watanabe | H04N 21/472 463/31 |
| 2012/0240161 A1 | 9/2012 | Kuo | |
| 2012/0256000 A1 | 10/2012 | Cok | |
| 2012/0256007 A1 | 10/2012 | Cok | |
| 2012/0257766 A1 | 10/2012 | Seymour et al. | |
| 2012/0308202 A1 | 12/2012 | Murata et al. | |
| 2013/0014155 A1 | 1/2013 | Clarke et al. | |
| 2013/0021535 A1 | 1/2013 | Kim et al. | |
| 2013/0024783 A1 | 1/2013 | Brakensiek et al. | |
| 2013/0057543 A1 | 3/2013 | Mann et al. | |
| 2013/0060660 A1 | 3/2013 | Maskatia et al. | |
| 2013/0074125 A1 | 3/2013 | Hao et al. | |
| 2013/0094013 A1 | 4/2013 | Hovis et al. | |
| 2013/0110672 A1* | 5/2013 | Yang | G06Q 20/353 705/26.8 |
| 2013/0113830 A1* | 5/2013 | Suzuki | G06T 3/00 345/634 |
| 2013/0113993 A1* | 5/2013 | Dagit, III | G06F 3/017 348/552 |
| 2013/0115974 A1 | 5/2013 | Lee et al. | |
| 2013/0144727 A1 | 6/2013 | Morot-Gaudry et al. | |
| 2013/0219434 A1* | 8/2013 | Farrell | H04N 21/4722 725/60 |
| 2013/0291018 A1 | 10/2013 | Billings et al. | |
| 2013/0339991 A1 | 12/2013 | Ricci | |
| 2014/0035726 A1 | 2/2014 | Schoner | |
| 2014/0035913 A1* | 2/2014 | Higgins | G06T 17/00 345/420 |
| 2014/0043332 A1* | 2/2014 | Rollett | G06T 15/04 345/426 |
| 2014/0068670 A1 | 3/2014 | Timmermann et al. | |
| 2014/0122564 A1 | 5/2014 | Arora et al. | |
| 2014/0130102 A1 | 5/2014 | Iijima et al. | |
| 2014/0134947 A1 | 5/2014 | Stouder-Studenmund | |
| 2014/0208355 A1 | 7/2014 | Gregov et al. | |
| 2014/0281985 A1 | 9/2014 | Garrison et al. | |
| 2015/0095774 A1 | 4/2015 | Bates et al. | |
| 2015/0156562 A1 | 6/2015 | Treder et al. | |
| 2015/0195474 A1* | 7/2015 | Lu | G08C 17/02 348/552 |
| 2015/0235672 A1 | 8/2015 | Cudak et al. | |
| 2015/0339508 A1 | 11/2015 | Hosokane | |
| 2015/0357001 A1 | 12/2015 | Aliverti et al. | |

FOREIGN PATENT DOCUMENTS

| | | |
|---|---|---|
| WO | 2003084229 | 10/2003 |
| WO | 2014036413 | 3/2014 |

OTHER PUBLICATIONS

U.S. Appl. No. 13/709,768, filed Dec. 10, 2012 entitled "Providing Content Via Multiple Display Devices."

U.S. Appl. No. 13/227,097 entitled "Synchronizing Video Content With Extrinsic Data" and filed Sep. 7, 2011.

U.S. Appl. No. 13/601,267 entitled "Enhancing Video Content With Extrinsic Data" and filed Aug. 31, 2012.

U.S. Appl. No. 13/601,235 entitled "Timeline Interface for Video Content" and filed Aug. 31, 2012.

U.S. Appl. No. 13/601,210 entitled "Providing Extrinsic Data for Video Content" and filed Aug. 31, 2012.

U.S. Appl. No. 13/927,970 entitled "Providing Soundtrack Information During Playback of Video Content" and filed Jun. 26, 2013.

(56) References Cited

OTHER PUBLICATIONS

U.S. Appl. No. 14/034,055 entitled "Playback of Content Using Multiple Devices" and filed Sep. 23, 2013.
"Entertainment is more amazing with Xbox SmartGlass," Xbox SmartGlass 1 Companion Application—Xbox.com, retrieved from "http://www.xbox.com/en-US/smartglass," retrieved Dec. 4, 2012.
International Searching Authority and Written Opinion dated Mar. 21, 2014 for PCT/US2013/057543 filed Aug. 30, 2013.
"Sony Pictures to smarten up Blu-ray with MovieiQ, the 'killer app for BD-Live,'" Engadget, retrieved from http://www.engadget.com/2009/06/18/sony-pictures-to-smarten-up-blu-ray-with-movieiq-the-killer-ap/, Jun. 18, 2009.
"Hulu 'Face Match' feature attaches an actor's entire history to their mug," Engadget, retrieved from http://www.engadget.com/20 11/12/08/hulu-face-match-feature-attaches-an-actors-entire-h istory-to/, Dec. 8, 2011.
"TVPlus for the iPad," iTunes Store, retrieved from "http://itunes.apple.com/us/app/tvplus/id444774882?mt=B," updated Apr. 13, 2012.
"Wii U GamePad," Wii U Official Site—Features, retrieved from "http://www.nintendo.com/wiiu/features/," retrieved Dec. 4, 2012.
U.S. Appl. No. 14/225,864, filed Mar. 26, 2014, Response to Final Office Action dated Jul. 13, 2015.
U.S. Appl. No. 14/225,864, filed Mar. 26, 2014, Final Office Action dated Jul. 13, 2015.
U.S. Appl. No. 14/225,864, filed Mar. 26, 2014, Response to Non-Final Office Action dated Mar. 3, 2015.
U.S. Appl. No. 14/225,864, filed Mar. 26, 2014, Non-Final Office Action dated Mar. 3, 2015.
U.S. Appl. No. 15/154,233, filed May 13, 2016, Non-Final Office Action dated Jun. 2, 2017.
U.S. Appl. No. 15/154,233, filed May 13, 2016, Response to Restriction/Election dated Feb. 3, 2017.
U.S. Appl. No. 15/154,233, filed May 13, 2016, Restriction/Election dated Feb. 3, 2017.
U.S. Appl. No. 13/227,097, filed Sep. 7, 2011, Notice of Allowance dated Oct. 22, 2013.
U.S. Appl. No. 13/227,097, filed Sep. 7, 2011, Response to Non-Final Office Action dated Apr. 9, 2013.
U.S. Appl. No. 13/227,097, filed Sep. 7, 2011, Non-Final Office Action dated Apr. 9, 2013.
U.S. Appl. No. 14/826,508, filed Aug. 14, 2015, Response to Non-Final Office Action dated Oct. 26, 2016.
U.S. Appl. No. 14/826,508, filed Aug. 14, 2015, Non-Final Office Action dated Oct. 26, 2016.
U.S. Appl. No. 14/218,408, filed Mar. 18, 2014, Response to Non-final Office Action dated Mar. 30, 2017.
U.S. Appl. No. 14/218,408, filed Mar. 18, 2014, Notice of Allowance dated Aug. 15, 2017.
U.S. Appl. No. 13/927,970, filed Jun. 26, 2013, Non-Final Office Action dated Apr. 3, 2017.
U.S. Appl. No. 13/927,970, filed Jun. 26, 2013, Response to Non-Final Office Action dated Apr. 3, 2017.
U.S. Appl. No. 13/927,970, filed Jun. 26, 2013, Non-Final Office Action dated Nov. 2, 2017.
U.S. Appl. No. 13/927,970, filed Jun. 26, 2013, Response to Non-Final Office Action dated Nov. 2, 2017.
U.S. Appl. No. 14/493,970, filed Sep. 23, 2014, Response to Non-Final Office Action dated Jun. 6, 2017.
U.S. Appl. No. 14/493,970, filed Sep. 23, 2014, Response to Final Office Action dated Feb. 10, 2017.
U.S. Appl. No. 14/493,970, filed Sep. 23, 2014, Final Office Action dated Feb. 10, 2017.
U.S. Appl. No. 14/493,970, filed Sep. 23, 2014, Final Office Action dated Dec. 7, 2017.
U.S. Appl. No. 14/225,864, filed Mar. 26, 2014, Notice of Allowance dated Feb. 1, 2016.
U.S. Appl. No. 15/154,233, filed May 13, 2016, Response to Non-Final Office Action dated Jun. 2, 2017.
U.S. Appl. No. 15/154,233, filed May 13, 2016, Notice of Allowance dated Nov. 15, 2017.
U.S. Appl. No. 14/826,508, filed Aug. 14, 2015, Notice of Allowance dated Apr. 27, 2017.
U.S. Appl. No. 15/164,070, filed May 25, 2016, Non-Final Office Action dated Feb. 7, 2018.
U.S. Appl. No. 14/615,950, filed Feb. 6, 2015, Response to Final Office Action dated Dec. 1, 2016.
U.S. Appl. No. 14/615,950, filed Feb. 6, 2015, Non-Final Office Action dated May 5, 2017.
U.S. Appl. No. 14/615,950, filed Feb. 6, 2015, Response to Non-Final Office Action dated May 5, 2017.
U.S. Appl. No. 14/615,950, filed Feb. 6, 2015, Final Office Action dated Oct. 24, 2017.
U.S. Appl. No. 14/615,950, filed Feb. 6, 2015, Response to Final Office Action dated Oct. 24, 2017.
U.S. Appl. No. 14/615,950, filed Feb. 6, 2015, Notice of Allowance dated Mar. 15, 2018.
U.S. Appl. No. 14/493,970, filed Sep. 23, 2014, Non-Final Office Action dated Jun. 6, 2017.
U.S. Appl. No. 14/218,408, filed dated Mar. 18, 2014, Non-final Office Action dated Mar. 30, 2017.
U.S. Appl. No. 14/493,970, filed Sep. 23, 2014, Patent Board of Appeals Decision dated Apr. 18, 2018.
U.S. Appl. No. 15/792,217, filed Oct. 24, 2017, Non-Final Office Action dated Apr. 18, 2018.
SO/IEC 18004:2006. Information technology—Automatic identification and data capture techniques—QR Code 2005 bar code symbology specification. International Organization for Standardization, Geneva, Switzerland.
Canadian Patent Application CA2, 882,899 filed on Aug. 30, 2013, Determination of Allowance dated Nov. 9, 2017.
Canadian Patent Application CA2, 882,899, Office Action dated Mar. 30, 2017.
Canadian Patent Application CA2, 882,899, Office Action dated Apr. 6, 2016.
European Patent Application EP13832505.5, Extended European Search Report dated Mar. 15, 2016.
European Patent Application EP13832505.5 filed on Aug. 30, 2013, Office Action dated Jul. 10, 2017.
U.S. Appl. No. 14/218,408, filed Mar. 18, 2014, Response to Final Office Action dated Nov. 25, 2016.
U.S. Appl. No. 14/218,408, filed Mar. 18, 2014, Final Office Action dated Nov. 25, 2016.
U.S. Appl. No. 14/218,408, filed Mar. 18, 2014, Response to Non-Final Office Action dated Apr. 11, 2016.
U.S. Appl. No. 14/218,408, filed Mar. 18, 2014, Non-Final Office Action dated Apr. 11, 2016.
U.S. Appl. No. 14/218,408, filed Mar. 18, 2014, Response to Final Office Action dated Jul. 27, 2015.
U.S. Appl. No. 14/218,408, filed Mar. 18, 2014, Final Office Action dated Jul. 27, 2015.
U.S. Appl. No. 14/218,408, filed Mar. 18, 2014, Response to Non-Final Office Action dated Feb. 12, 2015.
U.S. Appl. No. 14/218,408, filed Mar. 18, 2014, Non-Final Office Action dated Feb. 12, 2015.
U.S. Appl. No. 13/927,970, filed Jun. 26, 2013, Response to Restriction/Election dated Oct. 5, 2016.
U.S. Appl. No. 13/927,970, filed Jun. 26, 2013, Restriction/Election dated Oct. 5, 2016.
U.S. Appl. No. 14/034,055, filed Sep. 23, 2013, Examiner's Answer dated May 24, 2017.
U.S. Appl. No. 14/034,055, filed Sep. 23, 2013, Response to Final Office Action dated Jul. 29, 2016.
U.S. Appl. No. 14/034,055, filed Sep. 23, 2013, Final Office Action dated Jul. 29, 2016.
U.S. Appl. No. 14/034,05, filed Sep. 23, 2013, Response to Non-Final Office Action dated Apr. 7, 2016.
U.S. Appl. No. 14/034,055, filed Sep. 23, 2013, Non-Final Office Action dated Apr. 7, 2016.
U.S. Appl. No. 14/034,055, filed Sep. 23, 2013, Response to Final Office Action dated Jan. 6, 2016.
U.S. Appl. No. 14/034,055, filed Sep. 23, 2013, Final Office Action dated Jan. 6, 2016.

(56) References Cited

OTHER PUBLICATIONS

U.S. Appl. No. 14/034,055, filed Sep. 23, 2013, Response to Non-Final Office Action dated Aug. 3, 2015.
U.S. Appl. No. 14/034,055, filed Sep. 23, 2013, Non-Final Office Action dated Aug. 3, 2015.
U.S. Appl. No. 14/493,970, filed Sep. 23, 2014, Response to Non-Final Office Action dated Jul. 29, 2016.
U.S. Appl. No. 14/493,970, filed Sep. 23, 2014, Non-Final Office Action dated Jul. 29, 2016.
U.S. Appl. No. 14/615,950, filed Feb. 6, 2015, Final Office Action dated Dec. 1, 2016.
U.S. Appl. No. 14/615,950, filed Feb. 6, 2015, Response to Non-Final Office Action dated May 26, 2016.
U.S. Appl. No. 14/615,950, filed Feb. 6, 2015, Non-Final Office Action dated May 26, 2016.
U.S. Appl. No. 14/615,950, filed Feb. 6, 2015, Response to Election/Restriction dated Feb. 10, 2016.
U.S. Appl. No. 14/615,950, filed Feb. 6, 2015, Restriction/Election dated Feb. 10, 2016.
U.S. Appl. No. 13/601,210, filed Aug. 31, 2012, Notice of Allowance dated Sep. 23, 2014.
U.S. Appl. No. 13/601,210, filed Aug. 31, 2012, Response to Final Office Action dated Jan. 2, 2014.
U.S. Appl. No. 13/601,210, filed Aug. 31, 2012, Final Office Action dated Jan. 2, 2014.
U.S. Appl. No. 13/601,210, filed Aug. 31, 2012, Response to Non-Final Office Action dated Aug. 1, 2013.
U.S. Appl. No. 13/601,210, filed Aug. 31, 2012, Non-Final Office Action dated Aug. 1, 2013.
U.S. Appl. No. 13/601,235, filed Aug. 31, 2012, Notice of Allowance dated Mar. 27, 2015.
U.S. Appl. No. 13/601,235, filed Aug. 31, 2012, Response to Non-Final Office Action dated Sep. 11, 2014.
U.S. Appl. No. 13/601,235, filed Aug. 31, 2012, Non-Final Office Action dated Sep. 11, 2014.
U.S. Appl. No. 13/601,267, filed Aug. 31, 2012, Notice of Allowance dated Jan. 21, 2014.
U.S. Appl. No. 13/601,267, filed Aug. 31, 2012, Response to Non-Final Office Action dated Aug. 14, 2013.
U.S. Appl. No. 13/601,267, filed Aug. 31, 2012, Non-Final Office Action dated Aug. 14, 2013.
U.S. Appl. No. 13/709,768, filed Dec. 10, 2012, Notice of Allowance dated Mar. 17, 2016.
U.S. Appl. No. 13/709,768, filed Dec. 10, 2012, Response to Final Office Action dated Oct. 23, 2015.
U.S. Appl. No. 13/709,768, filed Dec. 10, 2012, Final Office Action dated Oct. 23, 2015.
U.S. Appl. No. 13/709,768, filed Dec. 10, 2012, Response to Non-Final Office Action dated Apr. 21, 2015.
U.S. Appl. No. 13/709,768, filed Dec. 10, 2012, Non-Final Office Action dated Apr. 21, 2015.
U.S. Appl. No. 13/709,768, filed Dec. 10, 2012, Response to Non-Final Office Action dated Oct. 3, 2014.
U.S. Appl. No. 13/709,768, filed Dec. 10, 2012, Non-Final Office Action dated Oct. 3, 2014.
U.S. Appl. No. 15/792,217, filed Oct. 24, 2017, Response to Non-Final Office Action dated Apr. 18, 2018 filed Jul. 16, 2018.
U.S. Appl. No. 14/034,055, filed Sep. 23, 2013, Notice of Allowance dated Sep. 14, 2018.
U.S. Appl. No. 14/493,970, filed Sep. 23, 2014, Non-Final Office Action dated Sep. 21, 2018.
U.S. Appl. No. 15/164,070, filed May 25, 2016, Final Office Action dated Aug. 16, 2018.
U.S. Appl. No. 15/792,217, filed Oct. 24, 2017, Final Office Action dated Sep. 28, 2018.
U.S. Appl. No. 13/927,970, filed Jun. 26, 2013, Non-Final Office Action dated Oct. 5, 2018.

\* cited by examiner

SHOPPING EXPERIENCE USING MULTIPLE COMPUTING DEVICES

BACKGROUND

Users may access content through a computing device having a single, relatively large display, such as a digital television. Interacting with such a device may be cumbersome. For example, providing textual input to the digital television may involve an on-screen keyboard that uses arrow buttons on a remote control to select the keys. Further, it may be difficult to provide additional information about the content being rendered due to readability, aesthetics, or other concerns.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to extending a shopping experience from one computing device to another computing device. An online shopping experience using a digital television exclusively may be frustrating to users. For example, textual input via a digital television typically involves an on-screen keyboard manipulated via a remote control. The typing speed achieved via such an on-screen keyboard may be extremely slow, especially where arrow buttons on the remote control are employed to navigate to different keys on the keyboard. Thus, it can be difficult for users to enter item search queries, create item reviews, or provide user names and passwords, billing information, payment information, and other information that may be involved in a shopping experience. Also, it may be challenging to read paragraphs of text on a digital television with a large screen. Accordingly, it may be preferable to browse item descriptions and customer reviews via a tablet or other computing device.

Various embodiments of the present disclosure facilitate extending a shopping experience from a digital television to another computing device and vice versa. A digital television with a relatively large display may be employed to provide an enhanced shopping experience. For example, a digital television may be used to provide simulated "try it on" functionality for apparel items. However, according to various embodiments, a user may employ another computing device such as a tablet, smartphone, laptop, desktop, etc., to browse an online catalog and select an item to be virtually tried on. Further, the other computing device may be employed for the user to provide information to consummate an order of an item. In the following discussion, a general description of the system and its components is provided, followed by a discussion of the operation of the same.

Figure 1:
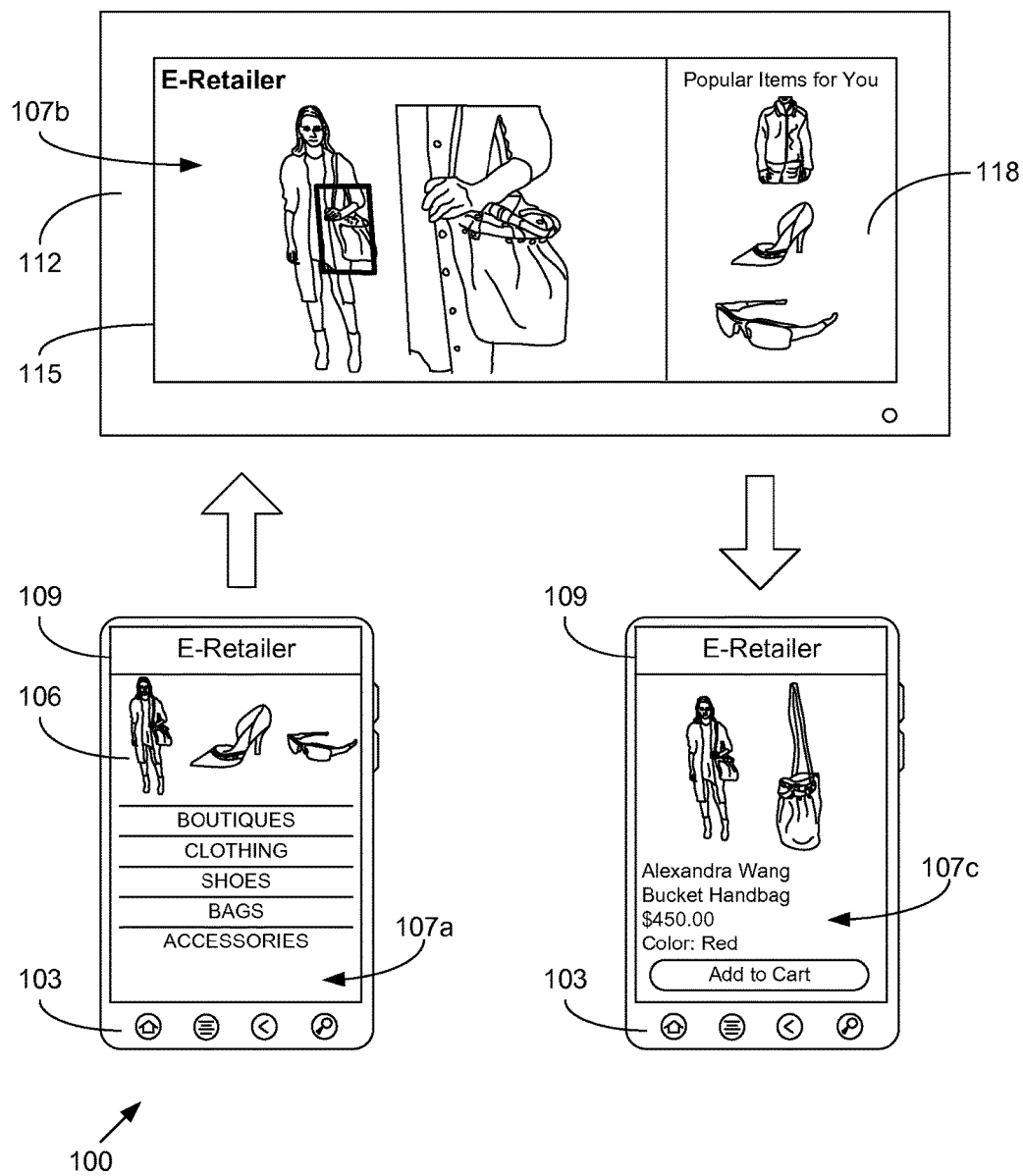
FIG. 1 is a drawing of an exemplary shopping experience according to various embodiments of the present disclosure.

With reference to FIG. 1, shown is an exemplary shopping experience 100 according to various embodiments. In this example, a user may employ a mobile computing device 103 to access a network site or application associated with an online merchant and/or electronic marketplace. The user may select a particular item 106 rendered in a user interface 107a on a display 109 of the mobile computing device 103. The selection of the item 106 is communicated to a digital television 112, which is executing a shopping assistance application.

The digital television 112 renders a user interface 107b upon a display 115 that provides an immersive experience for the item 106, e.g., a high-resolution image of the particular item 106 with zoom functionality. The user interface 107b may also facilitate a "try it on" feature. Images of other items 106 that are recommended or similar to the particular item 106 may be rendered in a recommendations panel 118. The shopping assistance application may be controlled by physical gestures, voice commands, a remote control, and/or other user input approaches. The shopping assistance application may also be controlled via user input provided through the mobile computing device 103. Through the shopping experience application, the user may choose to add the particular item 106 to a shopping list, initiate an order of the particular item 106, select another item 106, and/or perform other actions. In particular, as a result of such actions, the shopping assistance application may send a directive to the mobile computing device 103 to render information in a user interface 107c on the display 109. Such information may correspond to an item detail screen, a shopping list screen, a checkout screen to consummate an order, and other information.

Figure 2:
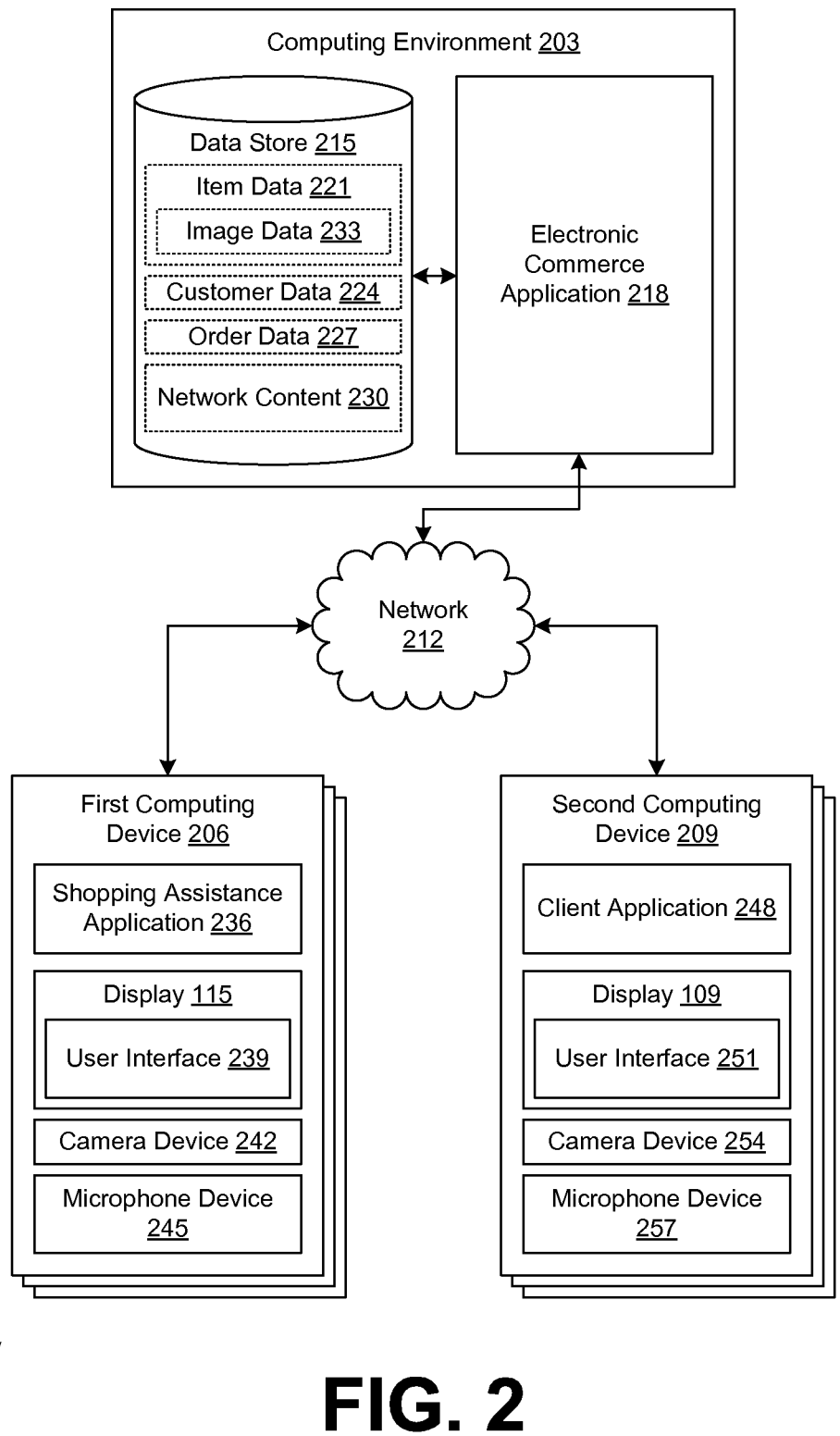
FIG. 2 is a drawing of a networked environment according to various embodiments of the present disclosure.

Referring next to FIG. 2, shown is a networked environment 200 according to various embodiments. The networked environment 200 includes a computing environment 203, one or more first computing devices 206, and one or more second computing devices 209 in data communication via a network 212. The network 212 includes, for example, the Internet, intranets, extranets, wide area networks (WANs), local area networks (LANs), wired networks, wireless networks, or other suitable networks, etc., or any combination of two or more such networks. In various embodiments, a first computing device 206 and a second computing device 209 may be in data communication with each other over a local area network, a personal area network, a direct connection, etc.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an electronic commerce application 218 and other applications, services, processes, systems, engines, or functionality not discussed in detail herein. The electronic commerce application 218 is executed to perform various functions relating to the online presence of one or more merchants. Specifically, the electronic commerce application 218 may facilitate searching, browsing, and ordering from an item catalog, among other functions. To this end, the electronic commerce application 218 may generate and serve up network content, such as network pages and/or other data for client applications. In some embodiments, the electronic commerce application 218 may perform video encoding and/or other functions to support operations by the first computing device 206 and the second computing device 209.

The data stored in the data store 215 includes, for example, item data 221, customer data 224, order data 227, network content 230, and potentially other data. The item data 221 includes various data relating to items 106 (FIG. 1) offered for purchase, rental, download, etc., through the electronic commerce application 218. The items 106 may correspond to products, goods, services, software downloads, and other types of items. The item data 221 may be associated with image data 233 corresponding to images of the respective items. The images may correspond to thumbnail images, medium resolution images, high resolution images, and/or other sizes and resolutions. The images may include multiple views for a particular item 106 (e.g., front view, rear view, side view, top view, etc.). The images may correspond to different options for a particular item 106 (e.g., sizes, colors, fabrics, etc.). In some embodiments, the image data 233 may include three-dimensional models of items 106. Also, the image data 233 may include video streams of images that depict items 106.

The customer data 224 includes data relating to customers of the merchant(s) associated with the electronic commerce application 218. Such data may include shopping lists (e.g., shopping carts, gift registries, watch lists, and other lists of items 106), preferences, contact information, payment instruments, shipping addresses, and other information. The order data 227 includes data relating to customer orders of items 106 that are in progress and/or have been completed. The network content 230 includes text, images, video, audio, templates, and/or other content that may be served up by the electronic commerce application 218.

The first computing device 206 is representative of a plurality of client devices that may be coupled to the network 212. The first computing device 206 may comprise, for example, a processor-based system such as a computer system. Such a computer system may be embodied in the form of digital television 112 (FIG. 1). Alternatively, such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The first computing device 206 includes a display 115, which may be a relatively large, high resolution display. The display 115 may comprise, for example, one or more devices such as liquid crystal display (LCD) displays, gas plasma-based flat panel displays, organic light emitting diode (OLED) displays, LCD projectors, or other types of display devices, etc.

The first computing device 206 may be configured to execute various applications such as a shopping assistance application 236 and/or other applications. The shopping assistance application 236 may be executed in a first computing device 206, for example, to access network content 230 served up by the computing environment 203 and/or other servers, thereby rendering a user interface 239 on the display 115. The shopping assistance application 236, may, for example, correspond to a browser, a mobile application, or other client application, etc., and the user interface 239 may correspond to a network page, a mobile application screen, etc.

The shopping assistance application 236 extends a shopping experience from the second computing device 209 to the first computing device 206 and vice versa. In this regard, the shopping assistance application 236 may facilitate viewing of high-resolution images of items 106, a "try it on" experience for items 106, and other functions. Further, the shopping assistance application 236 may be configured to receive various user commands to add items 106 to shopping lists, initiate orders of items 106, view additional information about items 106, view information regarding other items 106, and so on. The first computing device 206 may include a camera device 242, a microphone device 245, and/or other input devices. The first computing device 206 may be configured to execute applications beyond the shopping assistance application 236, such as, for example, video applications, browsers, mobile applications, email applications, social networking applications, and/or other applications.

The second computing device 209 is representative of a plurality of client devices that may be coupled to the network 212. The second computing device 209 may comprise, for example, a processor-based system such as a computer system. Such a computer system may be embodied in the form of a mobile computing device 103 (FIG. 1), such as, for example, a laptop computer, personal digital assistants, cellular telephones, smartphones, set-top boxes, music players, web pads, tablet computer systems, electronic book readers, or other devices with like capability. In some embodiments, the second computing device 209 may correspond to desktop computers, digital televisions, game consoles, and/or other non-mobile devices. The second computing device 209 includes a display 109. The display 109 may comprise, for example, one or more devices such as liquid crystal display (LCD) displays, gas plasma-based flat panel displays, organic light emitting diode (OLED) displays, LCD projectors, or other types of display devices, etc.

The second computing device 209 may be configured to execute various applications such as a client application 248 and/or other applications. The client application 248 may be executed in a second computing device 209, for example, to access network content served up by the computing environment 203 and/or other servers, thereby rendering a user interface 251 on the display 109. The client application 248 may, for example, correspond to a browser, a mobile application, etc., and the user interface 251 may correspond to a network page, a mobile application screen, etc.

Specifically, the client application 248 may be employed to interact with the electronic commerce application 218 to search and browse items 106 from an item catalog and to place orders for items 106. Further, the client application 248 may be employed to select items 106 to be presented by the shopping assistance application 236 of the first computing device 206. The second computing device 209 may include a camera device 254, a microphone device 257, and/or other input devices. The second computing device 209 may be configured to execute applications beyond the client application 248 such as, for example, browsers, mobile applications, email applications, social networking applications, and/or other applications.

Next, a general description of the operation of the various components of the networked environment 200 is provided. To begin, a user at the second computing device 209 interacts with the client application 248 to request network content 230 from the electronic commerce application 218. For example, the client application 248 may request network pages or other forms of network content 230 relating to item search, item browsing, item ordering, and/or other shopping-related functions. The client application 248 may render a user interface 251 on the display 109.

Concurrently, the user may also execute the shopping assistance application 236 of the first computing device 206. The shopping assistance application 236 is configured to render content that supports the shopping experience of the user through the second computing device 209. Such content may comprise videos and other images. For example, the shopping assistance application 236 may render a high resolution image of an item 106 or items 106 that are described by content being rendered by the client application 248. The user may be able to issue various user commands to the shopping assistance application 236 to zoom, pan, scroll, etc. relative to the high resolution image. Additional images and/or item information, e.g., in a recommendations panel 118, may be rendered for other items 106 that are recommended or are otherwise similar to the currently selected item(s) 106. Various techniques relating to using a second screen for displaying content are described in U.S. patent application Ser. No. 13/709,768 filed on Dec. 10, 2012 entitled "PROVIDING CONTENT VIA MULTIPLE DISPLAY DEVICES," which is incorporated by reference herein in its entirety.

User interaction with the shopping assistance application 236 may be facilitated through several approaches. As a first example, a microphone device 245 of the first computing device 206 may capture audio. The first computing device 206 may process the audio to determine various voice commands issued by the user. The user may say, for example, "buy it now," "try it on," "exit," and/or other voice commands.

As a second example, the camera device 242 of the first computing device 206 may capture a video stream of the user. In the captured video, the user may perform physical gestures to communicate commands. Non-limiting examples of physical gestures that may be identified include an open palm, a grabbing action, a moving hand, a closed fist, and so on for one or more hands. In one embodiment, the shopping assistance application 236 may process the captured video to identify such gestures. In another embodiment, the captured video stream may be uploaded to the computing environment 203 for server-side processing, with the gesture identification being communicated to the shopping assistance application 236.

Further non-limiting examples of user input to the shopping assistance application 236 may include keyboard input, touch screen input, remote control input, mouse input, and input from other input devices. Additionally, in some embodiments, the input for the shopping assistance application 236 may be captured, and potentially processed, by the client application 248 of the second computing device 209. For example, a video stream of the user, including physical gestures, may be captured by a camera device 254 of the second computing device 209. Also, audio containing voice commands of the user may be captured by a microphone device 257 of the second computing device 209. Such gestures and/or voice commands captured by way of the second computing device 209 may be employed to control the shopping assistance application 236 of the first computing device 206.

User commands provided to the shopping assistance application 236 may be employed to view additional information about an item 106, initiate an order for an item 106, add an item 106 to a shopping list, view information about another item 106, and/or other functions. Such functions may include sending data encoding a command to the electronic commerce application 218 and/or the client application 248. For example, in response to a voice command of "add to cart," the shopping assistance application 236 may send a shopping cart addition directive to the electronic commerce application 218, where the directive specifies a particular item 106.

Alternatively, directives may be sent to the client application 248, possibly by way of the electronic commerce application 218. For example, a user command to view information about another item 106 may result in a directive being sent to the client application 248, whereupon the client application 248 renders a user interface 251 upon the display 109 to present a detail page regarding the other item 106. In some cases, directives or instructions may be sent from the client application 248 to the shopping assistance application 236, also possibly by way of the electronic commerce application 218. For example, a user may select a particular item 106 through the user interface 251 to be shown with a high resolution image in the user interface 239 rendered upon the display 115. To this end, a directive may be sent to the shopping assistance application 236, whereupon the shopping assistance application 236 renders a user interface 239 showing high resolution images of the particular item 106.

Through this communication between the first computing device 206 and the second computing device 209, the shopping experience between the displays 115 and 109 is maintained with a level of synchronization. As an example, display 115 may show a high resolution image of an item 106 for which a detail page is shown on the display 109. As another example, a user may select a particular search result shown on the display 109, whereupon high resolution images for the item 106 corresponding to the particular search result are rendered on the display 115. As yet another example, a user may select a "buy it now" function through the shopping assistance application 236, whereupon a first screen in an order pipeline is rendered upon the display 109. The user may then provide textual input to consummate the order via the second computing device 209.

Another functionality provided by the first computing device 206 may correspond to "try it on" functionality for apparel, shoes, handbags, hats, and/or other items 106. A camera device 242 (or 254) may capture a video stream of a user, and an image of an item 106 may be composited or superimposed upon the video stream of the user. In one embodiment, the image of the item 106 may be rendered by the shopping assistance application 236 at a fixed location, and the user may position himself or herself in front of the camera device 242 (or 254) so that he or she appears to "try on" the item. In another embodiment, the user may move, resize, stretch, skew, and/or otherwise transform the item 106 so that the item 106 appears to be "tried on."

The user may use voice commands, gestures, etc. or input via the second computing device 209 to select different options (e.g., colors, sizes, fabrics, etc.) for the item 106. Selection of such options may result in different images being presented upon the display 115 or an existing image being manipulated to appear to show the selected option (e.g., a red scarf being color corrected to be a blue version of the scarf, one fabric being replaced with a different fabric, an image of a dress at one size being scaled to represent the dress at a different size, and so on).

Different images of the item 106 may be employed for the user to turn to different angles to "model" the item 106 at different views. For example, a front-view image of a dress may be replaced with a side-view image of the same dress when the user turns to her side. Such an image replacement may be performed automatically through analysis of the user movement shown in the captured video, or manually in response to user commands. In one embodiment, a video of the item 106 may be employed, and the user may move to mimic the predefined movement of the item 106 as shown in the video. The video may be transformed (scaled, skewed, moved, etc.) as desired by the user so that the user appears to model the item 106.

In various embodiments, a three-dimensional camera device 242 (or 254) may be employed, and a three-dimensional model of the user may be generated from video captured from the three-dimensional camera device 242 (or 254). A three-dimensional model of an item 106 stored in the image data 233 may then be rendered upon the three-dimensional model of the user. The resulting image or video may then be shown upon the display 115 by the shopping assistance application 236. The image may be updated and re-rendered upon movement of the user.

In one embodiment, the shopping assistance application 236 may be configured to recommend a particular item 106 or a size of a particular item 106 to a user based at least in part on the video of the user captured from the camera device 242 (or 254). For example, the shopping assistance application 236 may perform an analysis to ascertain the human body dimensions of the user. The shopping assistance application 236, possibly through interactions with the electronic commerce application 218, may determine items 106 that would fit the measured human body dimensions of the user.

Figure 3A:
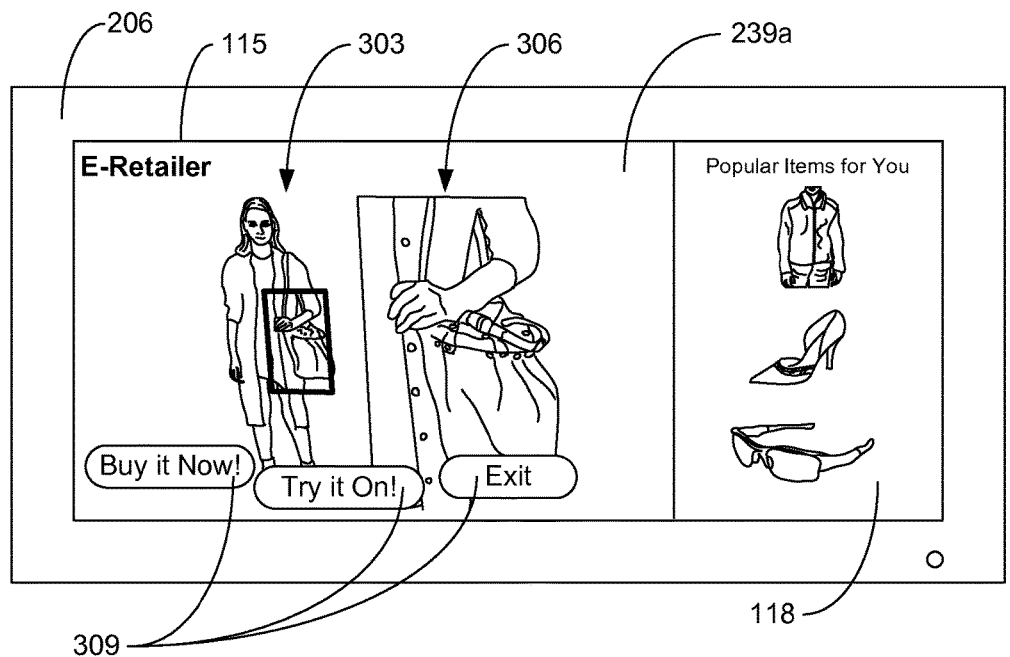
FIGS. 3A-3C are drawings of exemplary user interfaces rendered upon a first computing device in the networked environment of FIG. 2 according to various embodiments of the present disclosure.

Turning now to FIG. 3A, shown is one example of a user interface 239a rendered by a shopping assistance application 236 (FIG. 2) upon a display 115 of a first computing device 206 in the networked environment 200 (FIG. 2). The user interface 239a depicts an immersive shopping experience including a high resolution image 303 of a selected item 106 (FIG. 1). The high resolution image 303 corresponds to a model carrying an item 106 that is a handbag. The user interface 239a further includes a zoomed region 306 showing a zoomed view of a portion of the high resolution image 303. Additionally, the user interface 239a includes a recommendations panel 118 showing several other items 106 that may be selected. Several dialog prompts 309 indicate certain phrases that may be interpreted as voice commands (e.g., "Buy it Now!" "Try it On!" and "Exit") to control the shopping assistance application 236.

Figure 3B:
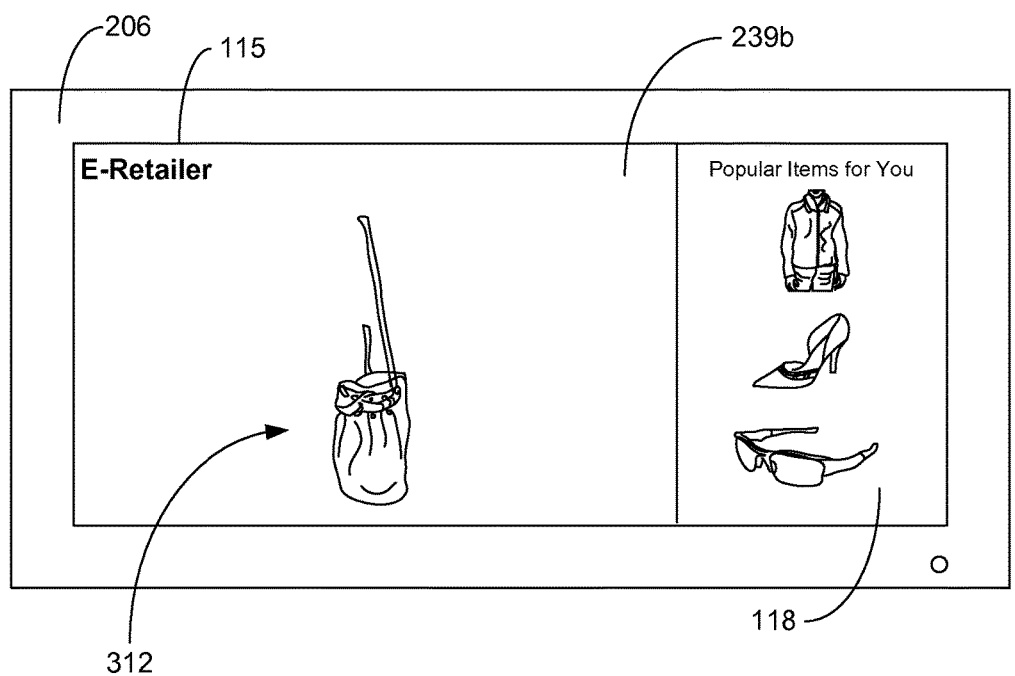

Continuing to FIG. 3B, shown is another example of a user interface 239b rendered by a shopping assistance application 236 (FIG. 2) upon a display 115 of a first computing device 206 in the networked environment 200 (FIG. 2). The user interface 239b depicts an immersive shopping experience including "try it on" functionality for a selected item 106 (FIG. 1) that is a handbag. The user interface 239b shows a view 312 of the item 106 that is ready for compositing onto an image of a user. The user interface 239a further includes a zoomed region 306 showing a zoomed view of a portion of the high resolution image 303. Additionally, the user interface 239a includes a recommendations panel 118 showing several other items 106 that may be selected. Several dialog prompts 309 indicate certain phrases that may be interpreted as voice commands (e.g., "Buy it Now!" "Try it On!" and "Exit") to control the shopping assistance application 236.

Figure 3C:
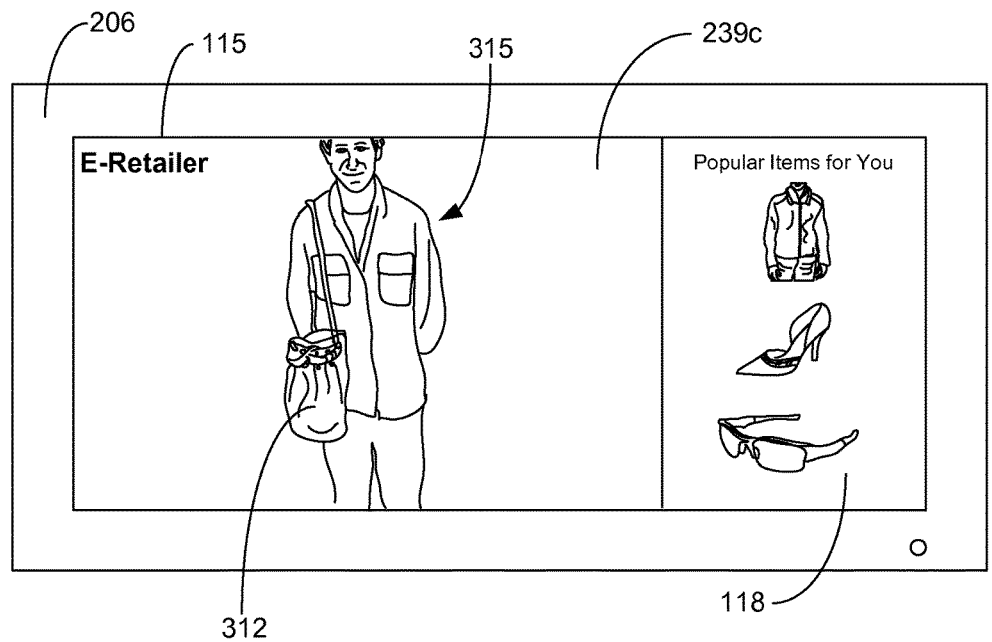

Moving to FIG. 3C, shown is another example of a user interface 239c rendered by a shopping assistance application 236 (FIG. 2) upon a display 115 of a first computing device 206 in the networked environment 200 (FIG. 2). The user interface 239c depicts an immersive shopping experience including "try it on" functionality for a selected item 106 (FIG. 1) that is a handbag. The user interface 239c shows a view 312 of the item 106 that is transformed and composited onto an image of the user 315 as captured by a camera device 242 (FIG. 2). In one example, the user may employ a physical gesture to grab the view 312, possibly resize it, and then move it to a suitable location on the display 115.

Figure 4A:
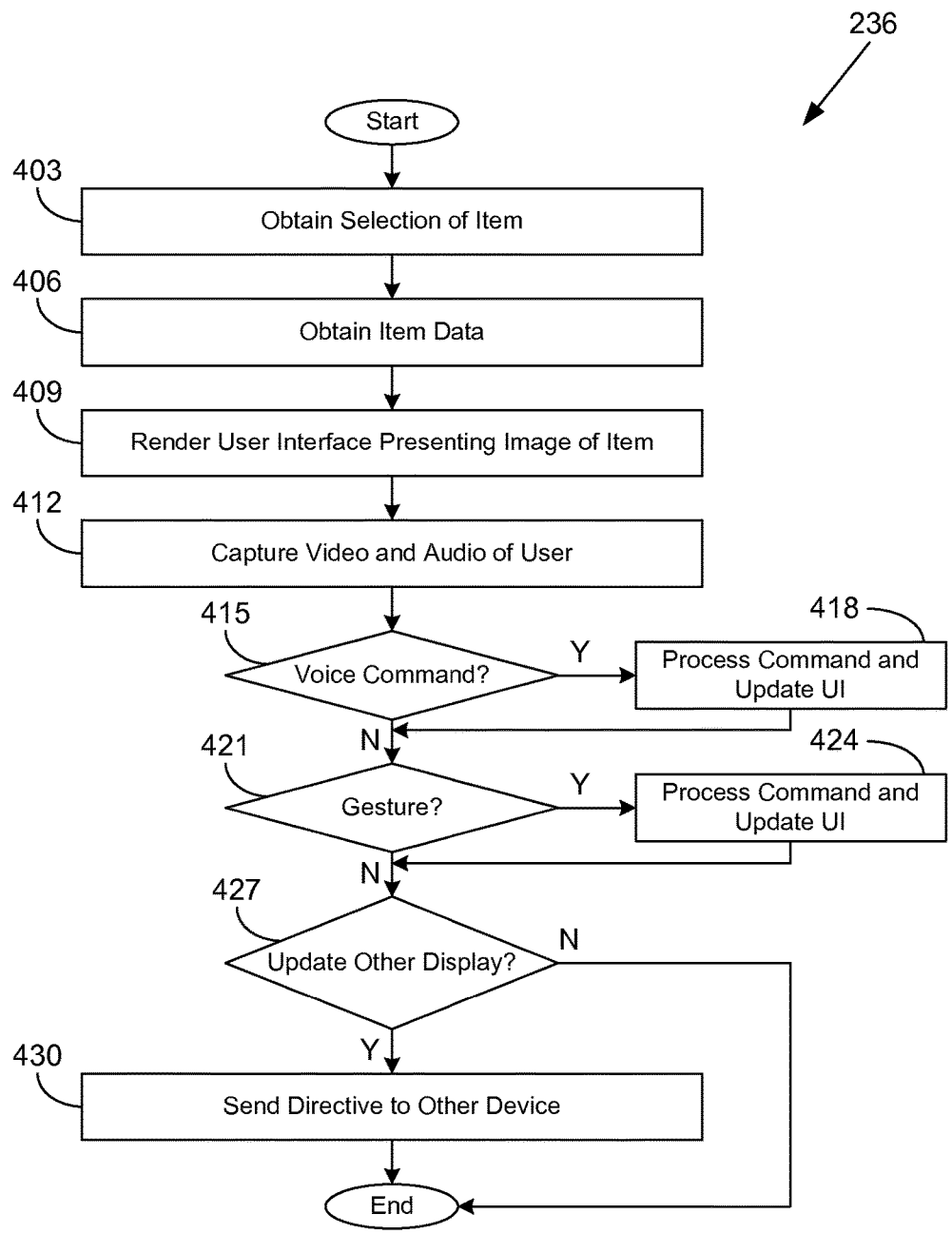
FIGS. 4A and 4B are flowcharts illustrating examples of functionality implemented as portions of a shopping assistance application executed in a first computing device in the networked environment of FIG. 2 according to various embodiments of the present disclosure.

Referring next to FIG. 4A, shown is a flowchart that provides one example of the operation of a portion of the shopping assistance application 236 according to various embodiments. It is understood that the flowchart of FIG. 4A provides merely an example of the many different types of functional arrangements that may be employed to implement the operation of the portion of the shopping assistance application 236 as described herein. As an alternative, the flowchart of FIG. 4A may be viewed as depicting an example of steps of a method implemented in the first computing device 206 (FIG. 2) according to one or more embodiments.

Beginning with box 403, the shopping assistance application 236 obtains a selection of an item 106 (FIG. 1). For example, the selection may have originated via a second computing device 209 (FIG. 2). In box 406, the shopping assistance application 236 obtains item data 221 (FIG. 2) for the item 106 from the electronic commerce application 218 (FIG. 2). In box 409, the shopping assistance application 236 renders a user interface 239 (FIG. 2) on the display 115 (FIG. 2), where the user interface 239 extends a shopping experience for the selected item 106 from the display 109 (FIG. 2) to the display 115 (FIG. 2).

In box 412, the shopping assistance application 236 captures audio and/or video of the user by way of the camera device 242 (FIG. 2) and/or the microphone device 245 (FIG. 2). Alternatively, the video and/or audio may be captured from the camera device 254 (FIG. 2) and/or the microphone device 257 (FIG. 2) and obtained by the shopping assistance application 236 over the network 212 (FIG. 2). In box 415, the shopping assistance application 236 determines whether a voice command is present in the audio. If a voice command is present, the shopping assistance application 236 moves to box 418 and processes the voice command and updates the user interface 239. The shopping assistance application 236 then continues to box 421. If a voice command is not present, the shopping assistance application 236 moves from box 415 to box 421.

In box 421, the shopping assistance application 236 determines whether a physical gesture has been captured from the user on video. If a physical gesture has been made, the shopping assistance application 236 moves to box 424 and processes the command associated with the physical gesture and updates the user interface 239. The shopping assistance application 236 then continues to box 427. If a physical gesture has not been made, the shopping assistance application 236 moves from box 421 to box 427.

In box 427, the shopping assistance application 236 determines whether the display 109 (FIG. 2) should be updated. If the display 109 should be updated, the shopping assistance application 236 continues to box 430 and sends a directive to the second computing device 209. For example, the shopping assistance application 236 may receive a checkout voice command, and the shopping assistance application 236 may send a directive to the second computing device 209 to initiate an order of the item 106. Thereafter, the portion of the shopping assistance application 236 ends. If the display 109 is not to be updated, the portion of the shopping assistance application 236 ends.

Figure 4B:
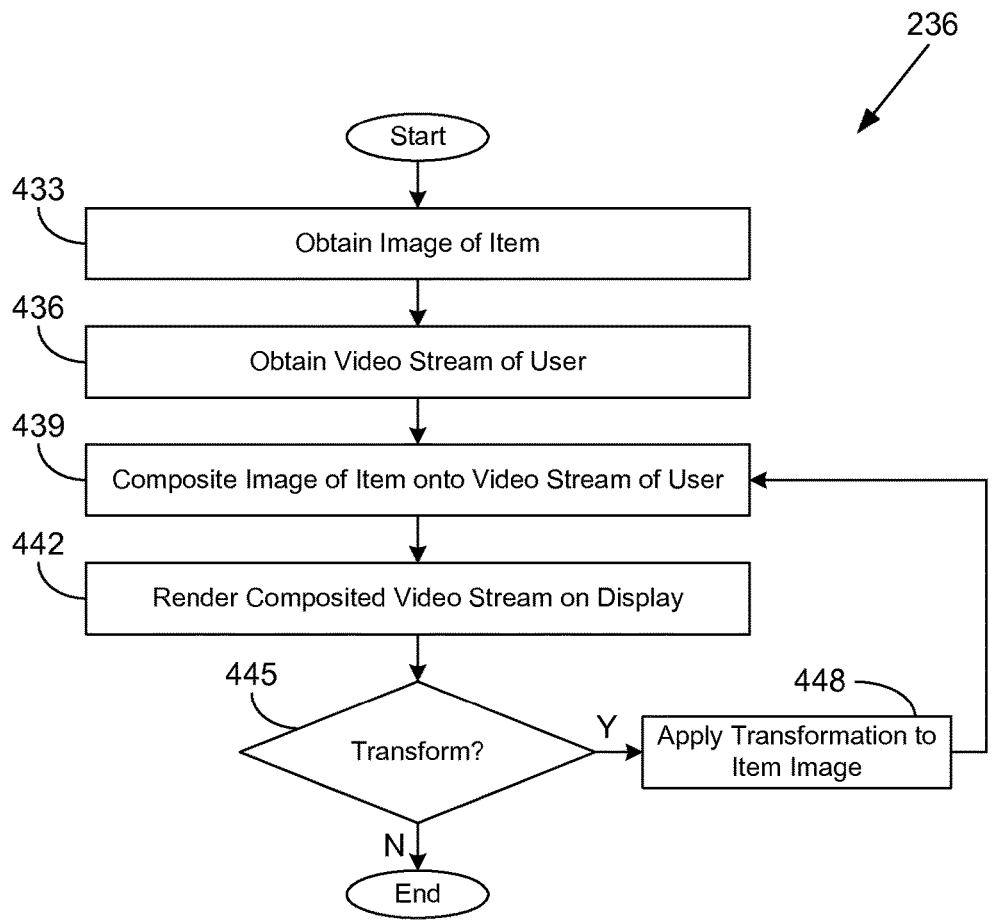

Turning now to FIG. 4B, shown is a flowchart that provides one example of the operation of another portion of the shopping assistance application 236 according to various embodiments. It is understood that the flowchart of FIG. 4B provides merely an example of the many different types of functional arrangements that may be employed to implement the operation of the portion of the shopping assistance application 236 as described herein. As an alternative, the flowchart of FIG. 4B may be viewed as depicting an example of steps of a method implemented in the first computing device 206 (FIG. 2) according to one or more embodiments.

Beginning with box 433, the shopping assistance application 236 obtains an image of an item 106 (FIG. 2) from the electronic commerce application 218 (FIG. 2). In box 436, the shopping assistance application 236 obtains a video stream depicting the user from the camera device 242 (FIG. 2). In box 439, the shopping assistance application 236 composites the image of the item 106 onto the video stream of the user. In box 442, the shopping assistance application 236 renders the composited video stream upon the display 115 (FIG. 1).

In box 445, the shopping assistance application 236 determines whether to transform the image of the item 106. For example, the shopping assistance application 236 may transform the image of the item 106 in response to receiving a transformation command from the user. Alternatively, the shopping assistance application 236 may transform the image of the item 106 automatically in response to detecting movement of the user within the video stream depicting the user. Thus, if the user physically moves to the left within the scene, the image of the item 106 may be transformed within the composited video stream so that the image of the item 106 is still superimposed upon the image of the user. If a transformation is to be applied, the shopping assistance application 236 moves to box 448 and applies the transformation to the image of the item 106. The shopping assistance application 236 then returns to box 439. If no transformation is to be performed, the portion of the shopping assistance application 236 ends.

Figure 4C:
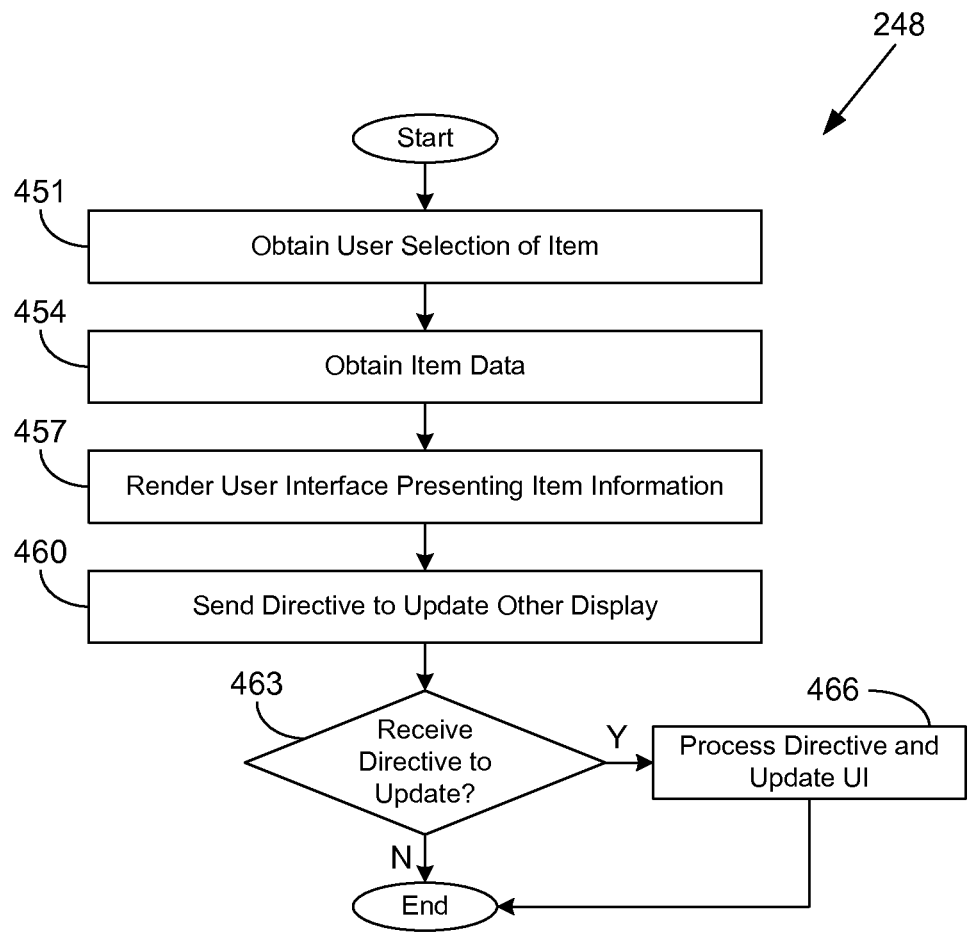
FIG. 4C is a flowchart illustrating one example of functionality implemented as portions of client application executed in a second computing device in the networked environment of FIG. 2 according to various embodiments of the present disclosure.

Continuing to FIG. 4C, shown is a flowchart that provides one example of the operation of a portion of the client application 248 according to various embodiments. It is understood that the flowchart of FIG. 4C provides merely an example of the many different types of functional arrangements that may be employed to implement the operation of the portion of the client application 248 as described herein. As an alternative, the flowchart of FIG. 4C may be viewed as depicting an example of steps of a method implemented in the second computing device 209 (FIG. 2) according to one or more embodiments.

Beginning with box 451, the client application 248 obtains a user selection of an item 106 (FIG. 1). In box 454, the client application 248 obtains item data 221 (FIG. 2) for the item 106 from the electronic commerce application 218 (FIG. 2). In box 457, the client application 248 renders a user interface 251 (FIG. 2) on the display 109 (FIG. 2) to present information relating to the selected item 106. In box 460, the client application 248 sends a directive to the electronic commerce application 218 and/or the shopping assistance application 236 (FIG. 2) to update the other display 115 (FIG. 2).

In box 463, the client application 248 determines whether a directive is received to update the user interface 251. For example, such a directive may originate in a user action relative to a user interface 239 (FIG. 2) rendered on the display 115. If a directive is received, the client application 248 moves to box 466 and processes the directive and updates the user interface 251 accordingly. The client application 248 may request additional information from the electronic commerce application 218 to facilitate this update. The portion of the client application 248 then ends. If a directive is not received, the client application 248 also ends.

Figure 5:
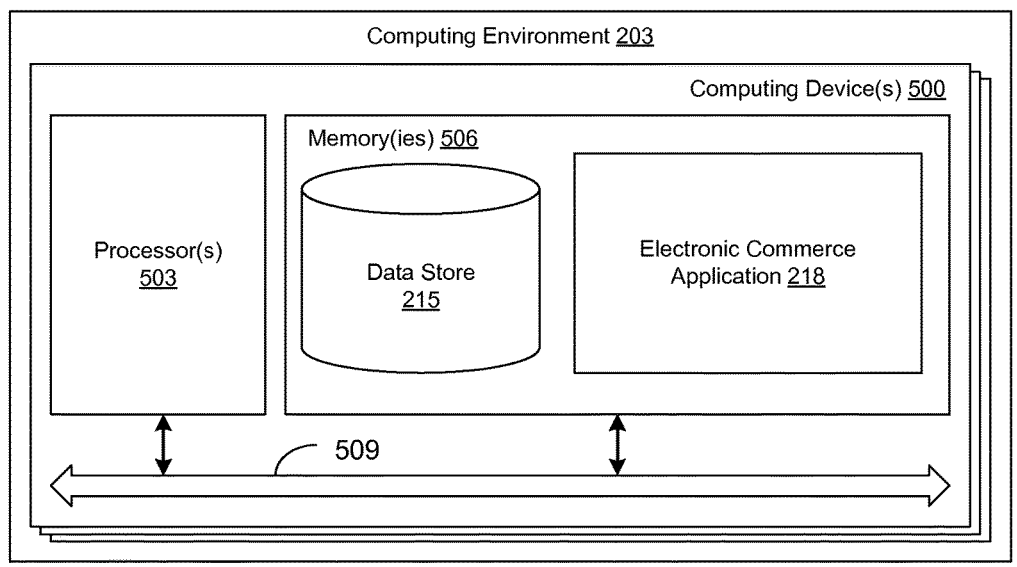
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the electronic commerce application 218 and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 218, the client application 248 (FIG. 2), the shopping assistance application 236 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4C the functionality and operation of an implementation of portions of the shopping assistance application 236 and the client application 248. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A-4C show a specific order of execution, it is understood that the order of execution may differ from that which is depicted. For example, the order of execution of two or more blocks may be scrambled relative to the order shown. Also, two or more blocks shown in succession in FIGS. 4A-4C may be executed concurrently or with partial concurrence. Further, in some embodiments, one or more of the blocks shown in FIGS. 4A-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 218, the client application 248, and the shopping assistance application 236, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying server instructions executable by a server computing device, wherein when executed the server instructions cause the server computing device to at least:
   generate a first user interface that is rendered upon a display of a mobile device, wherein the first user interface provides a first portion of a shopping experience comprising browsing a product catalog;
   receive from the mobile device a selection of a product to be virtually tried on by a user, wherein the product is selected from the product catalog;
   transmit, from the server computing device to the television system, data that transfers the shopping experience from the mobile device to a television system that is distinct from the mobile device by causing a second portion of the shopping experience comprising a second user interface comprising the product to be rendered upon a television display of the television system, wherein the mobile device is a mobile phone device or a laptop device;
   capture a video of the user via a camera device of the television system;
   transmit image data for the product from a network source, wherein the image data includes a first image of the product from a first viewing angle and a second image of the product from a second viewing angle, wherein the first image and the second image are still images of the product;
   generate, in a first area of the second user interface, a video signal showing the first image of the product from the first viewing angle being composited upon the video of the user, and in a second area of the second user interface, a zoomed view of the product, wherein the first image of the product is transformed based at least in part on a user position in the video of the user being captured via the camera device;
   render the video signal in the second user interface;
   update the video signal in the second user interface to replace the first image from the first viewing angle with the second image of the product from the second viewing angle based at least in part on another user position in the video of the user being captured via the camera device, wherein the second image is further transformed based at least in part on the another user position;
   identify, from the video of the user, a gesture to transfer the shopping experience from the television system to the mobile device to perform at least one action in association with the product; and
   transfer the shopping experience to the mobile device by transmitting a directive to the mobile device that causes the mobile device to update the first user interface to perform at least one action in association with the product.

2. The non-transitory computer-readable medium of claim 1, wherein the mobile device is configured to update the first user interface to display a shopping list in response to the directive, wherein the product is added to the shopping list.

3. The non-transitory computer-readable medium of claim 1, wherein the television system comprises a console device.

4. A system, comprising:
   a television device comprising a first processor;
   a television display in communication with the television device;
   a mobile device comprising a second processor and a display, wherein the mobile device is a mobile phone device or a laptop device and the mobile device is distinct from the television device; and
   a server device comprising a third processor that executes server instructions, which when executed cause the server device to at least:
      generate a first user interface that is rendered upon the display of the mobile device, wherein the first user interface provides a first portion of a shopping experience comprising browsing a catalog;
      receive from the mobile device a user selection of an item to be virtually tried on by a user, wherein the item is selected from the catalog;
      transmit, from the server computing device to the television system, data that transfers the shopping experience from the mobile device to the television device by causing a second portion of the shopping experience comprising a second user interface to be rendered on the television display, wherein the second user interface renders, in a first area of the second user interface, a first image from a first viewing angle of the item composited with a video of the user on the television display, and replaces the first image with a second image from a second view of the item based at least in part on a movement of the user within the video of the user, the second image being composited with the video of the user on the television display, and in a second area of the second user interface, a zoomed view of the product;
      identify a gesture to transfer the shopping experience from the television device to the mobile device to perform a user command in association with the item; and
      transfer the shopping experience to the mobile device by a directive transmitted to the mobile device that causes the mobile device to update the first user interface to implement the user command.

5. The system of claim 4, wherein when executed the server instructions further cause the server device to at least determine a suggested item to recommend to the user based at least in part on the video of the user.

6. The system of claim 4, wherein rendering the first image of the item on the television display with the video of the user further comprises applying a transformation to the first image of the item.

7. The system of claim 4, wherein the user command is implemented by sending the directive, and in response to the directive, the first user interface of the mobile device is updated to render for display at least a description of the item.

8. The system of claim 4, wherein when executed the server instructions further cause the server device to at least receive data encoding the user selection from the mobile device via a network.

9. The system of claim 4, wherein the user command is a command to transform the first image of the item and a transformation is implemented based at least in part on the command to transform the first image of the item.

10. The system of claim 4, wherein obtaining the user command comprises determining that the video of the user has changed.

11. The system of claim 4, wherein the user selection specifies an option associated with the item, and the first image of the item depicts the option being applied to the item.

12. The system of claim 4, wherein the user command requests an order of the item, and the order of the item is initiated in response to the user command.

13. The system of claim 4, wherein the user command requests an order of the item, and the second user interface is updated to request additional user input to consummate the order.

14. The system of claim 4, wherein the television device includes a camera device, and the video of the user is obtained via the camera device.

15. The system of claim 4, wherein the video of the user is obtained from a camera device of the mobile device.

16. The system of claim 4, wherein when executed the server instructions further cause the server device to at least process the video of the user to identify the gesture to transfer the shopping experience from the television device to the mobile device.

17. The system of claim 4, wherein when executed the server instructions further cause the server device to at least:
obtain audio via a microphone of the television device; and
process the audio to identify a voice command.

18. A method, comprising:
generating, using a server device, a first user interface and causing the first user interface to be rendered upon a display of a mobile device, wherein the first user interface provides a first portion of a shopping experience comprising browsing a catalog;
receiving, using the server device, a selection of an item to be virtually tried on by a user, wherein the item is selected from the catalog using the mobile device;
transmitting, using the server device, data that transfers the shopping experience from the mobile device to a television system that is distinct from the mobile device by causing a second portion of the shopping experience comprising a second user interface comprising the item to be rendered upon a television display of the television system, wherein the mobile device is a mobile phone device or a laptop device;
capturing, by a camera device of the television system, a video stream of a user wherein the second user interface renders, in a first area of the second user interface, a first image from a first viewing angle of the item composited with a video stream of the user on the display, and replaces the first image with a second image from a second view of the item based at least in part on a movement of the user within the video stream of the user, the second image being composited with the video stream of the user on the television display, and in a second area of the second user interface, a zoomed view of the product;
identifying, using the server device, a gesture to transfer the shopping experience from the television system to the mobile device to perform at least one action in association with the item; and
transferring, using the server device, the shopping experience to the mobile device by transmitting a directive to the mobile device that causes the mobile device to implement a user action.

19. The method of claim 18, wherein the user action is identified by processing the video stream using the server device.

20. The method of claim 18, wherein the user action is selected from a group consisting of: initiating an order of the item and adding the item to a shopping list.

21. The method of claim 18, wherein another user action is identified by receiving a voice command.

22. The method of claim 18, wherein the first user interface is updated to render network content obtained from a third computing device in response to the user action.

23. The method of claim 18, wherein the second user interface implements another user action by applying a transformation to the first image.

24. The method of claim 18, wherein the second user interface implements another user action by applying a transformation to the second image.

25. The method of claim 18, further comprising updating the second user interface by automatically applying a transformation to the first image of the item.

* * * * *